(No Model.)
J. B. SCHMID.
DOVETAILING MACHINE.
No. 339,700. Patented Apr. 13, 1886.
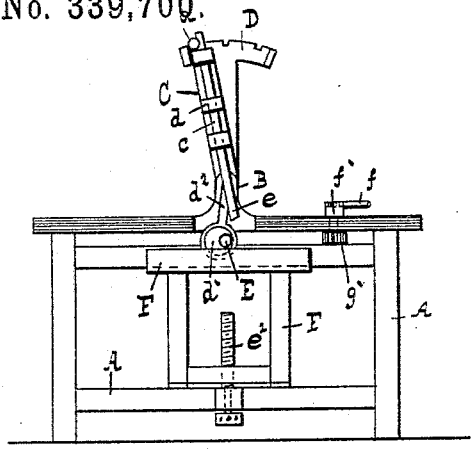
Fig. 1.
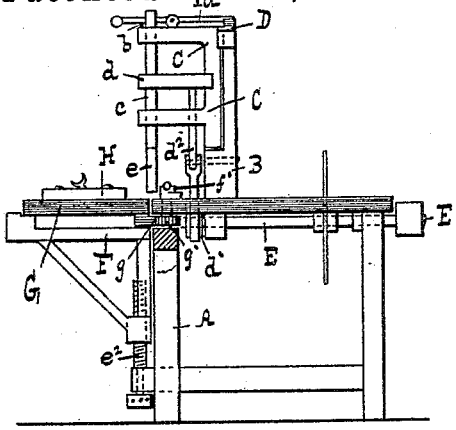
Fig. 2.
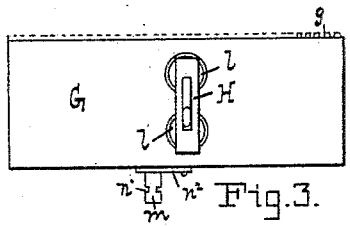
Fig. 3.
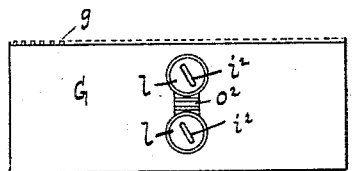
Fig. 4.
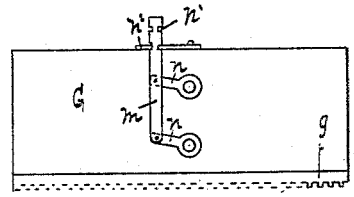
Fig. 5.
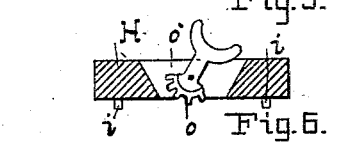
Fig. 6.
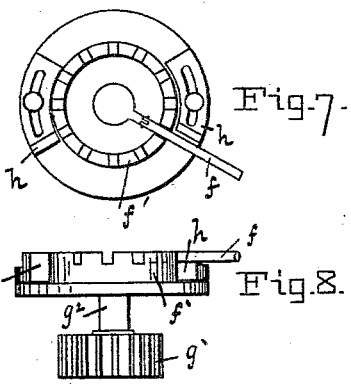
Fig. 7.
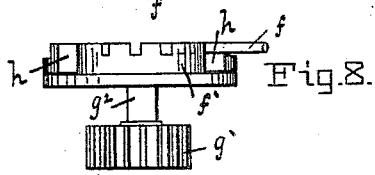
Fig. 8.
Fig. 9.
Fig. 10.
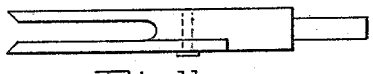
Fig. 11.
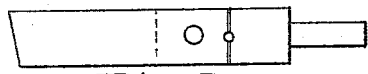
Fig. 12.
Witnesses:
G. F. H. Boyden.
Chas. W. Smiley.
Inventor:
John B. Schmid
By G. H. Boyden atty.

United States Patent Office.

JOHN B. SCHMID, OF BALTIMORE, MARYLAND.

DOVETAILING-MACHINE.

SPECIFICATION forming part of Letters Patent No. 339,700, dated April 13, 1886.

Application filed January 4, 1886. Serial No. 187,632. (No model.)

*To all whom it may concern:*

Be it known that I, JOHN B. SCHMID, a citizen of the United States, residing at Baltimore, in the State of Maryland, have invented certain new and useful Improvements in Dovetailing-Machines, of which the following is a specification, reference being had therein to to the accompanying drawings.

My invention relates to improvements in dovetailing-machines as illustrated in the accompanying drawings, in which—

Figure 1 is a front view; Fig. 2, a side view; Fig. 3, a top view of the sliding table; Fig. 4, a top view of the table with the guide removed; Fig. 5, an under view of the table, showing the reversing mechanism; Fig. 6, a sectional view of the guide; Fig. 7, a top view of the table-shifting mechanism; Fig. 8, a side view of the said shifting mechanism; Fig. 9, an end view of a chisel; Fig. 10, a side view of Fig. 9; Fig. 11, a top view of a chisel; Fig. 12, a side view of Fig. 10.

Similar letters refer to similar parts throughout the several views.

The letter A designates the frame of the machine, to which is attached the standard B, provided with the pivoted frame C, and the rack D, which holds the frame at the desired angle by means of the lever $a$, attached to the frame C, arranged to engage with the notches in the rack D, and held therein by the spring $b$.

The frame C is provided with a reciprocating rod, $c$, which is actuated by the cross-head $d$, connected to the eccentric $d'$ by means of the pointed rod $d^2$, by which the whole is operated from the main shaft E. To the lower end of the rod $c$ is attached the chisel $e$, which is constructed in form as shown either in Figs. 10 or 11.

To the frame A is arranged the vertically-adjustable frame F, which is adjusted by the screw $e^2$. On the frame F rests the sliding table G, which is actuated by means of the rack $g$ and the pinion $g'$, the latter being provided with a shaft, $g^2$, which extends up through the frame-top and secured to the jointed handle $f$, the handle $f$ and the pinion $g'$ being held at the desired point by the handle being placed in the notches in the circular band $f'$, and the movement of the same limited by the adjustable stop-piece $h$.

The guide H is arranged to move diagonal, as it is pushed toward the chisel, in either direction from its center line, by which the dovetail is cut in the end of the work, the diagonal movement of the guide H being accomplished by the pins $i$ entering the slots $i^2$ in the plates $l$, which are arranged to be placed at any angle, thereby moving the guides likewise when it is pushed forward. The position of the slots $i^2$ is regulated by drawing in or out the bar $m$, which is connected to the plates $l$ by the arms $n$ being pivoted thereto. The bar $m$ is provided with the notches $n'$, in which the latch $n^2$ is placed to hold the bar and slots $i^2$ in their proper positions, as desired.

The forward movement of the guide H is obtained by the toothed sector $o$, pivoted in the slot $o'$, engaging with the rack $o^2$ on the table G.

To the shaft E is arranged a circular saw, $p$, and a bit may be placed in the end of the shaft next to the table, thereby utilizing the machine for dovetailing, sawing, or boring.

The operation is as follows: When it is desired to cut the dovetail in the edge of the board, the slots in the plate $l$ are placed in a position to move the guide straight forward, and the frame C placed at an angle, as shown in Fig. 1. The board is then placed against the guide H and moved toward the chisel, which cuts an angular groove in the edge as the forward move continues to the desired depth. The board is then withdrawn and the frame C placed at an angle opposite to that formerly occupied, and the board again moved forward, which completes the dovetail. The rack $g$ and the pinion $g'$ are there brought into operation, and the table G thereby moved to one side the required distance and another dovetail cut, as above stated.

When it is desired to cut the dovetail in the surface of the board, the frame C is placed in a vertical position, and the slots $i^2$ in the plates $l$ placed at an angle, as shown in Fig. 4, which moves the board at an angle as it approaches the chisel, thereby cutting an angle-groove in the surface. The board is then withdrawn and the bar $m$ moved inward, which reverses the position of the slots $i^2$ and likewise the movement of the guide, thereby cutting the opposite side of the dovetail. The work is then moved to one side to cut the other dovetails by the mechanism above mentioned and in the manner described.

Having described my invention, what I claim is—

1. In a dovetailing-machine, the combination of the frame A, the standard B, attached to the frame, the frame C, pivoted to the standard and arranged to be placed at any desired angle on either side of a vertical plane, the rack D, secured to the standard and provided with notches which engage with the lever attached to the frame C, and the lever $a$, by which the frame is held at the desired angle, as set forth.

2. In a dovetailing-machine, the combination of the frame C, pivoted and arranged to be placed and held at the desired angle on either side of a vertical plane, the reciprocating rod $c$, arranged to hold a chisel, the cross-head $d$, connected to the rod $c$, the rod $d^2$, pivoted to the cross-head, the shaft E, and the eccentric $d'$, by which the rod $c$ is reciprocated and placed at the desired angle on both sides of a vertical plane.

3. In a dovetailing-machine, the combination of the frame A, the frame F, having a vertical adjustment, the screw $e'$, to adjust the frame, the table G, having a horizontal movement, the rack $g$, secured to the table, the pinion $g'$, geared with the rack $g$, the shaft $g^2$, extending from the pinion above the frame A, and the handle $f$, by which the table is moved sidewise, as set forth.

4. In a dovetailing-machine, the combination of the frame A, the pivoted frame C, arranged to carry the chisel, the table G, the guide H, having a diagonal movement, the pins $i$, secured to the guide and arranged to enter the slots $i^2$ in the plates $l$, the plates $l$, arranged to be partly turned on their centers, the bar $m$, connected to the plates $l$, by which the plates are moved in unison, and the latch $n^2$, arranged to hold the bar $m$ in the desired position, the sector $o$, arranged on the guide, and the rack $o^2$, by which the guide is moved forward and the movement of the same directed diagonally, as set forth.

In testimony whereof I affix my signature in presence of two witnesses.

JOHN B. SCHMID.

Witnesses:
G. A. BOYDEN.
JNO. T. MADDOX.